(12) United States Patent
Shimada et al.

(10) Patent No.: US 11,171,351 B2
(45) Date of Patent: Nov. 9, 2021

(54) PROTON CONDUCTING ELECTROLYTE

(71) Applicant: NATIONAL INSTITUTE OF ADVANCED INDUSTRIAL SCIENCE AND TECHNOLOGY, Tokyo (JP)

(72) Inventors: Hiroyuki Shimada, Aichi (JP); Toshiaki Yamaguchi, Aichi (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 157 days.

(21) Appl. No.: 16/489,034

(22) PCT Filed: Feb. 27, 2018

(86) PCT No.: PCT/JP2018/007159
§ 371 (c)(1),
(2) Date: Aug. 27, 2019

(87) PCT Pub. No.: WO2018/159584
PCT Pub. Date: Sep. 7, 2018

(65) Prior Publication Data
US 2020/0067120 A1 Feb. 27, 2020

(30) Foreign Application Priority Data
Feb. 28, 2017 (JP) .............................. JP2017-036423

(51) Int. Cl.
*H01M 8/00* (2016.01)
*H01M 8/1246* (2016.01)
*H01M 8/124* (2016.01)

(52) U.S. Cl.
CPC .. *H01M 8/1246* (2013.01); *H01M 2008/1293* (2013.01); *H01M 2300/0074* (2013.01)

(58) Field of Classification Search
CPC . H01B 1/08; C04B 2235/3232; C04B 35/486; C04B 2235/3279; Y02E 60/50; H01M 2008/1293; H01M 8/1246
See application file for complete search history.

(56) References Cited

U.S. PATENT DOCUMENTS

2016/0013463 A1* 1/2016 Roumi ................ H01M 10/052
429/145
2017/0373337 A1* 12/2017 Lim ..................... H01M 8/1253

* cited by examiner

*Primary Examiner* — Cynthia H Kelly
*Assistant Examiner* — Monique M Wills
(74) *Attorney, Agent, or Firm* — Wenderoth, Lind & Ponack, L.L.P.

(57) ABSTRACT

An electrolyte of a solid oxide cell is required to be capable of suppressing both gas cross-leak and electron leak. In addition, it is important from the viewpoint of a reduction in material costs and in the electric resistance of the electrolyte that the electrolyte is made into a thin film and that no expensive noble metal is used. The present invention provides a thin-film-shaped proton conducting electrolyte capable of suppressing both gas cross-leak and electron leak, a solid oxide cell using the proton conducting electrolyte, and a manufacturing method for the proton conducting electrolyte and the solid oxide cell. A proton conducting electrolyte using an oxide material having proton conductivity is provided. The proton conducting electrolyte includes a first portion containing Me (Me=at least any one of Ti, Mn, Fe, Co, Ni, and Cu), and a second portion different in Me content from the first portion.

10 Claims, 4 Drawing Sheets

PROTON CONDUCTING ELECTROLYTE

TECHNICAL FIELD

The present invention relates to a proton conducting electrolyte, and, more specifically, relates to a thin-film-shaped proton conducting electrolyte capable of suppressing both gas cross-leak and electron leak, a solid oxide cell using the thin-film-shaped proton conducting electrolyte, and a manufacturing method for the thin-film-shaped proton conducting electrolyte and the solid oxide cell.

BACKGROUND ART

A solid oxide cell for electrochemical reaction is known as a device capable of highly efficient energy conversion and has been researched and developed to put the solid oxide cell into practical use. Typical examples of the solid oxide cell include a solid oxide fuel cell and a solid oxide electrolytic cell.

The solid oxide cell is made mainly of an oxide, and is constructed by sandwiching an electrolyte, which is a compact substance, between electrodes (air electrode and fuel electrode), which are porous materials.

By adopting an oxide material having proton conductivity as an electrolyte (which will hereinafter be referred to as "proton conducting electrolyte"), a solid oxide cell for highly efficient power generation, hydrogen separation, and hydrogen compression can be achieved. The proton conducting electrolyte with high compactness prevents gas cross-leak, prevents unnecessary fuel consumption in power generation applications, thereby improves power generation efficiency, and improves the hydrogen separation performance of a hydrogen separation film. The proton conducting electrolyte serving as a conductive carrier with a high proton transference number allows a further improvement in power generation efficiency and hydrogen separation performance. In addition, from the viewpoint of a reduction in the electric resistance of an electrolytic film and in material costs, a requirement for film thickness reduction must be met. Thus, achieving a proton conducting electrolyte combining compactness, a high proton transference number, and a small film thickness is now in demand.

Because the proton conducting electrolyte has oxide ions and electrons (or holes), in addition to protons, that serve as charge carriers, the proton conducting electrolyte is referred to also as mixed ion conducting electrolyte or mixed ion conductor in some cases. In this description, however, only the name "proton conducting electrolyte" is used.

One type of the proton conducting electrolyte is perovskite oxide materials having chemical stability and high proton conductivity. These materials are sintering-resistant materials, which poses a problem that making the materials compact to use them as electrolytes is difficult. It has been reported, however, that adding various cations of rare-earth element, transition metal, etc., to the materials improves their sintering properties (see Non-Patent Literatures 1 and 2 and Patent Literatures 1 and 2).

It has also been reported that by a method of combining a porous support containing a transient metal and a thin-film-shaped proton conducting electrolyte into a laminated structure, a proper amount of a transient metal is caused to dissolve as a solid solution, into the proton conducting electrolyte to significantly improve the compactness of the proton conducting electrolyte. This technique achieves a proton conducting electrolyte that is high in compactness and small in film thickness, thus allowing manufacturing of a solid oxide cell having gas separation properties that meet practical standards (Patent Literature 3).

Adding a transient metal to the proton conducting electrolyte, however, may impair its electrical properties. Specifically, adding the transient metal may result in a drop in a proton transference number (the ratio of protons to the entire charge carriers) and in electric conductivity. This proton transference number is particularly important. The proton conducting electrolyte has oxide ions and electrons (or holes), in addition to protons, that serve as charge carriers. However, adding the transient metal causes the proton transference number to drop, and causes an electron (hole) transference number to increase as a consequence. This leads to electron leak (which collectively refers to leaks of electrons and holes), which reduces the power generation efficiency and hydrogen separation performance of the solid oxide cell (Non Patent Literature 3).

A successful case where excellent properties are obtained through suppression of gas cross-leak and electron leak has been reported. In this case, a proton conducting electrolyte and a Pd film are formed into a laminated structure to succeed in obtaining the excellent properties (Non Patent Literature 4). This method, however, needs to use Pd, which is an expensive noble metal, thus making cost reduction difficult.

CITATION LIST

Patent Literature

Patent Literature 1: Japanese Unexamined Patent Application Publication No. 2012-84460
Patent Literature 2: Japanese Unexamined Patent Application Publication No. 2012-221556
Patent Literature 3: Japanese Unexamined Patent Application Publication No. 2016-183094

Non Patent Literature

Non Patent Literature 1: F. Zhao, C. Jin, C. Yang, S. Wang, F. Chen, Journal of Power Sources, 196 (2011) 688-691
Non Patent Literature 2: S. Nikodemski, J. Tong, R. O'Hayre, Solid State Ionics, 253 (2013) 201-210
Non Patent Literature 3: Y. Okuyamal, N. Ebihara, K. Okuyama, Y. Mizutani, ECS Transactions, 68 (1) (2015) 2545-2553
Non Patent Literature 4: N. Ito, M. Iijima, K. Kimura, S. Iguchi, Journal of Power Sources, 152 (2005) 200-203

SUMMARY OF INVENTION

Technical Problem

As mentioned above, the electrolyte of the solid oxide cell is required to be capable of suppressing both gas cross-leak and electron leak. In addition, it is important from the viewpoint of a reduction in material costs and in the electric resistance of the electrolyte that the electrolyte is made into a thin film and that no expensive noble metal is used.

The present invention has been conceived in view of the above circumstances, and it is therefore an object of the present invention to provide a thin-film-shaped proton conducting electrolyte capable of suppressing both gas cross-leak and electron leak, the proton conducting electrolyte allowing cost reduction, and a solid oxide cell using the proton conducting electrolyte.

Solution to Problem

To solve the problems with the conventional techniques, the inventors have diligently conducted a series of researches and studies and have come up with an idea of configuring an electrolyte such that it has portions different in composition from each other, that is, providing the electrolyte with a portion that prevents gas cross-leak and a portion that prevents electron leak, thereby suppressing both gas cross-leak and electron leak. The inventors have then found that forming a gas cross-leak preventing portion and an electron leak preventing portion in an electrolytic layer or using a laminate composed of a gas cross-leak preventing layer and an electron leak preventing layer, as an electrolytic layer allows simultaneous suppression of gas cross-leak and electron leak, thus completing the present invention.

The present invention offers the following features.

(1) A proton conducting electrolyte using an oxide material having proton conductivity, the proton conducting electrolyte including: a first portion containing Me (Me=at least any one of Ti, Mn, Fe, Co, Ni, and Cu); and a second portion different in Me content from the first portion.

(2) The proton conducting electrolyte described in (1), wherein the proton conducting electrolyte is of a thin-film shape, and the Me content changes from one surface to another surface.

(3) The proton conducting electrolyte described in (1), including a plurality of layers including; a layer containing the first portion; and a layer containing the second portion.

(4) The proton conducting electrolyte described in (2), wherein the Me content is 2 mass % or more and 20 mass % or less in a portion ranging from the one surface to a point 0.5 μm or less distant from the one surface in a thickness direction while the Me content is 0 mass % or more and less than 2 mass % in a portion ranging from the other surface to a point 0.5 μm or less distant from the other surface in the thickness direction.

(5) The proton conducting electrolyte described in (3), including: a first layer having the Me of 2 mass % or more and 20 mass % or less; and a second layer having the Me of 0 mass % or more and less than 2 mass %, the second layer being laminated on the first layer.

(6) The proton conducting electrolyte according to any one of claims 1 to 5, wherein the oxide material is an oxide expressed as $A_XB_YO_{3+Z}$ (A=at least any one of Ca, Sr, Ba, and La, B=at least any one of Zr, Ce, Sc, Ga, Y, In, Gd, Dy, Ho, Tm, Er, Yb, and Lu, $0.8 \le X \le 1.2$, $0.8 \le Y \le 1.2$, $-1 \le Z \le 1$).

(7) The proton conducting electrolyte described in any one of (1) to (6), wherein the proton conducting electrolyte is 1.5 μm to 30 μm in thickness.

(8) A laminated structure including: the proton conducting electrolyte described in any one of (1) to (7); and an electrode formed on one surface of the proton conducting electrolyte.

(9) A solid oxide cell having another electrode formed on the other surface of the laminated structure described in (8).

Advantageous Effects of Invention

According to the proton conducting electrolyte of the present invention, gas cross-leak and electron leak can be suppresses simultaneously as costs are reduced. As a result, the solid oxide cell using the proton conducting electrolyte can achieve power generation efficiency and hydrogen separation performance higher than those achieved by the conventional technique.

DESCRIPTION OF EMBODIMENTS

In order to suppress both gas cross-leak and electron leak, a proton conducting electrolyte according to the present invention includes a first portion containing Me (Me=at least any one of Ti, Mn, Fe, Co, Ni, and Cu), and a second portion different in Me content from the first portion.

According to the present invention, the proton conducting electrolyte has a perovskite structure, and is an oxide expressed as $A_XB_YO_{3+Z}$ (A=at least any one of Ca, Sr, Ba, and La, B=at least any one of Zr, Ce, Sc, Ga, Y, In, Gd, Dy, Ho, Tm, Er, Yb, and Lu, $0.8 \le X \le 1.2$, $0.8 \le Y \le 1.2$, $-1 \le Z \le 1$).

A method of manufacturing a solid oxide cell is not limited to any particular method. For example, the solid oxide cell can be manufactured by coating a support, which is a material different from the proton conducting electrolyte, with one electrode, the proton conducting electrolyte, and another electrode and baking the support carrying the proton conducting electrolyte and electrodes. The one electrode and the other electrode are an air electrode and a fuel electrode, respectively, or a fuel electrode and an air electrode, respectively. The solid oxide cell may be manufactured also by coating the one electrode, which serves as the support, with the proton conducting electrolyte and the other electrode and baking the one electrode carrying the proton conducting electrolyte and the other electrode. The solid oxide cell may be manufactured also by coating both sides of the proton conducting electrolyte with a pair of electrodes, respectively, and baking the proton conducting electrolyte carrying the electrodes.

Figure 1:
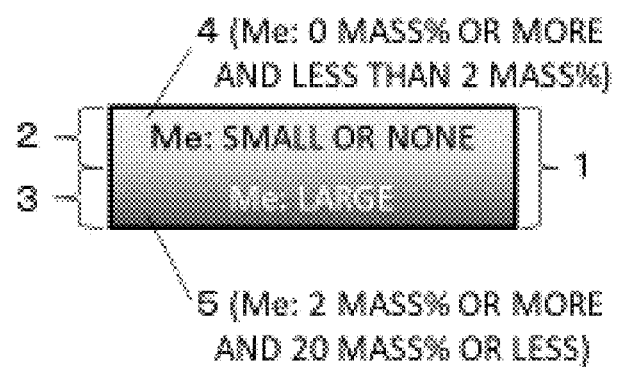
FIG. 1 is a diagrammatical sectional view of a proton conducting electrolyte (gradation structure) according to a first embodiment of the present invention.

A proton conducting electrolyte according to a first embodiment of the present invention will then be described with reference to FIG. 1. In the proton conducting electrolyte according to the first embodiment, the content of Me (Me=at least any one of Ti, Mn, Fe, Co, Ni, and Cu) changes from one surface to the other surface. More specifically, as shown in FIG. 1, a thin-film-shaped proton conducting electrolyte 1 has an upper portion 2 ranging from an upper surface to a center, and a lower portion 3 ranging from a lower surface to the center. The Me content decreases from the lower surface of the lower portion 3 to the upper surface of the upper portion 2. In other words, according to the proton conducting electrolyte 1, the concentration of Me content is gradating in a film thickness direction in a single electrolytic layer.

According to the proton conducting electrolyte 1 of this embodiment, the upper portion 2 has less Me content or no Me content, thus serving as a portion in which an extremely small amount of electron leak or no electron leak occurs. The upper portion 2 thus functions as an electron leak preventing portion capable of suppressing electron leak.

The lower portion 3 has more Me content and is made highly compact by a sintering accelerating effect of Me in a baking process during manufacturing of the proton conducting electrolyte 1. As a result, the lower portion 3 serves as a portion in which an extremely small amount of gas cross-leak or no gas cross-leak occurs. The lower portion 3 thus functions as a gas cross-leak preventing portion capable of suppressing gas cross-leak.

According to this embodiment, it is preferable that the Me content in the upper portion 2 of the proton conducting electrolyte 1 be relatively smaller than the Me content in the lower portion 3. This configuration offers an effect that the proton conducting electrolyte 1 suppresses both electron leak and gas cross-leak.

According to this embodiment, it is preferable that, in a portion 4 ranging from the upper surface of the upper portion 2 of the proton conducting electrolyte 1 to a point 0.5 μm or less distant from the upper surface in the thickness direction, the Me content be 0 mass % or more and less than 2 mass %, and that, in a portion 5 ranging from the lower surface of the lower portion 3 to a point less than 0.5 μm distant from the lower surface, the Me content be 2 mass % or more and 20 mass % or less. It is more preferable that, in the portion 4, the Me content be 0 mass % or more and less than 1 mass % and that, in the portion 5, the Me content be 2 mass % or more and 10 mass % or less. This configuration offers an optimum effect of suppressing electron leak and gas cross-leak.

Figure 2:
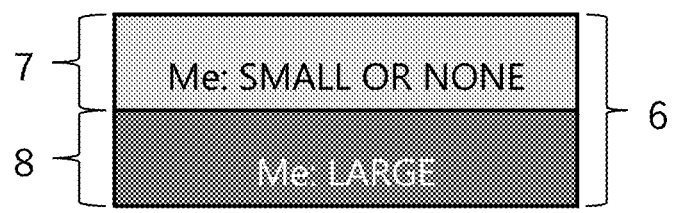
FIG. 2 is a diagrammatical sectional view of a proton conducting electrolyte (laminated structure) according to a second embodiment of the present invention.

A proton conducting electrolyte according to a second embodiment of the present invention will then be described with reference to FIG. 2. The proton conducting electrolyte according to the second embodiment has a plurality of layers including a layer having a first portion containing Me (Me=at least any one of Ti, Mn, Fe, Co, Ni, and Cu) and a layer having a second portion, the layer having a second portion being different in Me content from the layer having a first portion. More specifically, as shown in FIG. 2, a thin-film-shaped proton conducting electrolyte 6 is a laminate of a first layer 8 and a second layer 7. The Me content of the second layer 7 is smaller than that of the first layer 8. FIG. 2 shows an example in which the proton conducting electrolyte is a laminated structure composed of two layers. The proton conducting electrolyte, however, may be a laminated structure composed of three or more layers.

According to the proton conducting electrolyte 6 of this embodiment, the second layer 7, which has less Me content, serves as a layer in which an extremely small amount of electron leak or no electron leak occurs. The first layer 7 thus functions as an electron leak preventing layer capable of suppressing electron leak.

The first layer 8, which has more Me content, is made highly compact by a sintering accelerating effect of Me in a baking process during manufacturing of the proton conducting electrolyte 6. As a result, the second layer 8 serves as a layer in which an extremely small amount of gas cross-leak or no gas cross-leak occurs. The second layer 8 thus functions as a gas cross-leak preventing layer capable of suppressing gas cross-leak.

According to this embodiment, it is preferable that the Me content of the second layer 7 be relatively smaller than the Me content of the first layer 8. This configuration offers an effect that the proton conducting electrolyte 6 suppresses both electron leak and gas cross-leak.

According to this embodiment, it is preferable that, in the proton conducting electrolyte 6, the Me content of the second layer 7 be 0 mass % or more and less than 2 mass % while the Me content of the first layer 8 be 2 mass % or more and 20 mass % or less. It is more preferable that the Me content of the second layer 7 be 0 mass % or more and less than 1 mass % while the Me content of the first layer 8 be 2 mass % or more and 10 mass % or less. This configuration offers an optimum effect of suppressing electron leak and gas cross-leak.

The thickness of the proton conducting electrolyte 1 according to the first embodiment and of the proton conducting electrolyte 6 according to the second embodiment is 1.5 μm to 30 μm, or, preferably, is 3 μm to 25 μm, or, more preferably, is 10 μm to 20 μm. The thickness of the proton conducting electrolyte being within these value ranges offers a sufficient effect of suppressing both electron leak and gas cross-leak and allows a reduction in the electric resistance of the electrolyte.

The proton conducting electrolyte and the solid oxide cell having the proton conducting electrolyte according to the present invention are manufactured by the following manufacturing method in a preferable manner.

The solid oxide cell needs a porous support for maintaining its mechanical strength, and the porosity of the porous support is 10 volume % to 60 volume %. A material making up the porous support varies case by case. In one case, a fuel electrode of the solid oxide cell serves as the support. In another case, an oxide, such as alumina and zirconia, is adopted as the material. In still another case, a heat-resistant metal is used as the material.

As a manufacturing method for the support, any one of uniaxial press molding, injection molding, extrusion molding, and casting molding may be adopted, and the support may be formed into a tabular or tube shape by such methods. A process of making the support porous can be controlled to some extent depending on baking conditions and the density of a compact. When the porosity of the support is insufficient, using a carbon-based or hydrocarbon-based pore-forming material can provide the support with pores needed. The support needs to have both strength and gaseous diffusion property. The porosity of the support after being baked should desirably be 10 volume % to 60 volume %.

As the fuel electrode, a mixture of the oxide expressed as $A_XB_YO_{3+Z}$ and $MeO_\alpha$ (Me=at least any one of Ti, Mn, Fe, Co, Ni, and Cu) is used. A mixing ratio between the $A_XB_YO_{3+Z}$ and the $MeO_\alpha$ is determined with a mass ratio $A_XB_YO_{3+Z}:MeO_\alpha=0.3:0.7$ to $0.7:0.3$ being taken into consideration as criterion for a proper mixing ratio. The fuel electrode is formed on the porous support. However, the fuel electrode itself may be used as the porous support in some cases.

The fuel electrode is coated with the $A_XB_YO_{3+Z}$ making up the proton conducting electrolyte and is sintered together with $A_XB_YO_{3+Z}$ to obtain a thin-film-shaped proton conducting electrolyte. In other words, a laminated structure having the proton conducting electrolyte and an electrode (fuel electrode) formed on one surface of the proton conducting electrolyte is obtained. When the fuel electrode is sintered together with $A_XB_YO_{3+Z}$, Me ions (Me=at least any one of Ti, Mn, Fe, Co, Ni, and Cu) included in the fuel electrode diffuse into the proton conducting electrolyte, which accelerates compactification of the proton conducting electrolyte. Me ions' diffusing into the proton conducting electrolyte is more intensive on a side closer to the fuel electrode, where Me concentration becomes higher as a consequence. The Me content of the obtained proton conducting electrolyte, therefore, gradually decreases from the one surface in contact with the fuel electrode to the other surface opposite to the one surface.

As a coating method for the proton conducting electrolyte, any one of screen printing, spray coating, transferring, and dip coating can be adopted. By each of these methods, a film with high compaction density is obtained by optimizing the particle diffusion property of the oxide expressed as $A_xB_yO_{3+Z}$ in a solvent. The film is sintered as it is baked together with the porous support. It is preferable that the thickness of a compact layer of the proton conducting electrolyte resulting from the baking process be 1.5 µm to 30 µm. When the proton conducting electrolyte is used as an electrolyte of the solid oxide cell, the proton conducting electrolyte as a film needs to be made thinner as much as possible in order to reduce the electric resistance of the electrolyte. The proton conducting electrolyte made into an extremely thin film, however, may lead to a gas leak caused by a flaw of the film. It is thus most preferable that the thickness of the proton conducting electrolyte film be 1.5 µm or more, a thickness with which a flaw of the film is prevented, and 30 µm or less, a thickness with which the electric resistance of the electrolyte can be kept equal to or less than ½ of the total electric resistance of the solid oxide cell.

It is preferable that the fuel electrode and the proton conducting electrolyte be sintered together at temperatures ranging from 1250° C. to 1500° C. A temperature below 1250° C. makes the sintering process insufficient, leading to a failure in compactification of the proton conducting electrolyte. A temperature exceeding 1500° C., on the other hand, causes excessive diffusion of elements between the fuel electrode and the proton conducting electrolyte or volatilization of elements making up the fuel electrode and the proton conducting electrolyte.

An air electrode is formed on a location that is on the proton conducting electrolyte and that is different from a location where the fuel electrode lies. It is preferable that the air electrode be an oxide of a perovskite structure expressed as $C_xD_yO_{3+Z}$ (C=at least any one of Ca, Sr, Ba, La, Pr, Sm, and Gd, D=at least any one of Cr, Mn, Fe, Co, Ni, and Cu, $0.8 \leq X \leq 1.2$, $0.8 \leq Y \leq 1.2$, $-1 \leq Z \leq 1$). To give the air electrode proton conductivity or bring the thermal expansion coefficient of the air electrode closer to that of the proton conducting electrolyte, the $A_xB_yO_{3+Z}$ may be mixed into the $CXDYO_{3+Z}$. In this case, a mass ratio $C_xD_yO_{3+Z}:A_xB_yO_{3+Z}$=0.9:0.1 to 0.4:0.6 is taken into consideration as a criterion for a proper mixing ratio.

EXAMPLES

The present invention will then be described more specifically by explaining examples. The examples will be explained merely as exemplary cases and do not put limits on the present invention.

As an evaluation index for evaluating an electron leak and a gas cross-leak from the proton conducting electrolyte, an electromotive force that is generated between the air electrode and the fuel electrode when different gases are introduced respectively into the air electrode and the fuel electrode is used. A higher electromotive force means a success in suppressing the electron leak and gas cross-leak.

First Example

As a first example, a proton conducting electrolyte in which Ni content gradually decreases from one surface to the other surface and a solid oxide cell using the proton conducting electrolyte have been manufactured by the following procedure.

NiO and $BaZr_{0.7}Ce_{0.1}Y_{0.1}Yb_{0.1}O_{3-\alpha}$ (hereinafter "BZCYYb") are mixed together at a mass ratio of 6:4 to form mixed powder, which is subjected to uniaxial press molding under a pressure of 20 MPa per a circular area of 30 mm in diameter.

The resulting compact is baked at 900° C. for 1 hour to obtain a calcinated form of a fuel electrode support of 1 mm in thickness.

A ethanol/toluene-mixed-solvent-based BZCYYb-dispersed slurry, whose viscosity is adjusted, is applied to the calcinated form of the fuel electrode support by spin coating in such a way as to form a 20 µm-thick film of the BZCYYb-dispersed slurry. The fuel electrode support and the BZCYYb-dispersed slurry film are then sintered together at 1350° C. for 3 hours to obtain a compact composed of a proton conducting electrolyte layer and the fuel electrode support. After the baking process, the fuel electrode support shows a porosity of 12.7 volume %.

$La_{0.6}Sr_{0.4}Co_{0.2}Fe_{0.8}O_{3-\delta}$ (hereinafter "LSCF") powder and BZCYYb powder are mixed together at a mass ratio of 7:3 to create mixed powder. Then, the mixed powder and a mixture of ethyl cellulose, plasticizer, dispersant, and α-trepineol are kneaded by a kneading machine under room temperature for 1 minute and 30 seconds to obtain slurry for the air electrode. The slurry for the air electrode is then applied to a surface of proton conducting electrolyte layer that is different from a surface closer to the fuel electrode support, by screen printing, in such a way as to form a 20 µm-thick film of the slurry for the air electrode, which is then baked at 1050° C. for 1 hour to obtain the air electrode. Through the above processes, the solid oxide cell according to the first example has been manufactured.

Second Example

As a second example, a proton conducting electrolyte of a laminated structure composed of two layers different in Ni content from each other and a solid oxide cell using the proton conducting electrolyte have been manufactured by the following procedure.

NiO and BZCYYb are mixed together at a mass ratio of 6:4 to form mixed powder, which is subjected to uniaxial press molding under a pressure of 20 MPa per a circular area of 30 mm in diameter.

The resulting compact is baked at 900° C. for 1 hour to obtain a calcinated form of a fuel electrode support of 1 mm in thickness.

Ethanol/toluene-mixed-solvent-based BZCYYb-dispersed slurry, whose viscosity is adjusted, is applied to the calcinated form of the fuel electrode support by spin coating in such a way as to form a 10 µm-thick film of the BZCYYb-dispersed slurry. The fuel electrode support and the BZCYYb-dispersed slurry film are then sintered together at 1350° C. for 3 hours to obtain a compact composed of a proton conducting electrolyte layer and the fuel electrode support. The proton conducting electrolyte layer obtained by this process is defined as a proton conducting electrolyte first layer. After the baking process, the fuel electrode support shows a porosity of 12.2 volume %.

The ethanol/toluene-mixed-solvent-based BZCYYb-dispersed slurry, whose viscosity is adjusted, is applied to the proton conducting electrolyte first layer by spin coating in such a way as to form a 3 µm-thick film of the BZCYYb-dispersed slurry, which is then baked at 1300° C. for 1 hour to form a proton conducting electrolyte second layer having less Ni content than the proton conducting electrolyte first layer.

$La_{0.6}Sr_{0.4}Co_{0.2}Fe_{0.8}O_{3-\delta}$ (hereinafter "LSCF") powder and BZCYYb powder are mixed together at a mass ratio of 7:3 to create mixed powder. Then, the mixed powder and a mixture of ethyl cellulose, plasticizer, dispersant, and α-trepineol are kneaded by a kneading machine under room temperature for 1 minute and 30 seconds to obtain slurry for the air electrode. The slurry for the air electrode is then applied to the proton conducting electrolyte second layer by screen printing in such a way as to form a 20 µm-thick film of the slurry for the air electrode, which is then baked at 1050° C. for 1 hour to obtain the air electrode. Through the above processes, the solid oxide cell according to the second example has been manufactured.

Third Example

As a third example, a proton conducting electrolyte of a laminated structure composed of two layers different in Ni content from each other and an electrolyte support type solid oxide cell using the proton conducting electrolyte have been manufactured by the following procedure.

NiO and BZCYYb are mixed together such that BZCYYb contains Ni at a mass ratio of 2%. The resulting mixed powder is then subjected to uniaxial press molding under a pressure of 20 MPa per a circular area of 30 mm in diameter.

A compact resulting from the press molding is baked at 1350° C. for 3 hours to obtain a compact pellet of NiO-containing BZCYYb of 1 mm in thickness.

A mixture of BZCYYb powder, ethyl cellulose, plasticizer, dispersant, and α-trepineol is kneaded by a kneading machine under room temperature for 1 minute and 30 seconds to obtain BZCYYb slurry. The BZCYYb slurry is then applied to one surface of the pellet of NiO-containing BZCYYb by screen printing in such a way as to form a 10 µm-thick film of the BZCYYb slurry, which is then baked at 1300° C. for 1 hour to obtain a proton conducting electrolyte of a double-layer structure having a proton conducting electrolyte thin film formed on the pellet of NiO-containing BZCYYb, the proton conducting electrolyte thin film having less Ni content than the pellet.

NiO powder and BZCYYb powder are mixed together at a mass ratio of 6:4 to create mixed powder. Then, the mixed powder and a mixture of ethyl cellulose, plasticizer, dispersant, and α-trepineol are kneaded under room temperature by a kneading machine for 1 minute and 30 seconds to obtain slurry for the fuel electrode. The slurry for the fuel electrode is then applied to the surface of the pellet of NiO-containing BZCYYb of the proton conducting electrolyte having the double structure, by screen printing, in such a way as to form a 20 µm-thick film of the slurry for the fuel electrode, which is then baked at 1350° C. for 3 hour to obtain the fuel electrode. After the baking process, the fuel electrode shows a porosity of 22.8 volume %.

LSCF powder and BZCYYb powder are mixed together at a mass ratio of 7:3 to create mixed powder. Then, the mixed powder and a mixture of ethyl cellulose, plasticizer, dispersant, and α-trepineol are kneaded by a kneading machine under room temperature for 1 minute and 30 seconds to obtain slurry for the air electrode. The slurry for the air electrode is then applied to the proton conducting electrolyte thin film of the proton conducting electrolyte having the double structure, by screen printing, in such a way as to form a 20 µm-thick film of the slurry for the air electrode, which is then baked at 1050° C. for 1 hour to obtain the air electrode. Through the above processes, the solid oxide cell according to the third example has been manufactured.

Fourth Example

As a fourth example, a proton conducting electrolyte of a laminated structure composed of two layers different in Ni content from each other and an electrolyte support type solid oxide cell using the proton conducting electrolyte have been manufactured by the following procedure.

NiO and BZCYYb are mixed together such that BZCYYb contains Ni at a mass ratio of 2%. The resulting mixed powder is then subjected to uniaxial press molding under a pressure of 20 MPa per a circular area of 30 mm in diameter.

A compact resulting from the press molding is baked at 1350° C. for 3 hours to obtain a compact pellet of NiO-containing BZCYYb of 1 mm in thickness.

Ethanol/toluene-mixed-solvent-based BZCYYb-dispersed slurry, whose viscosity is adjusted, is applied to one surface of the pellet of NiO-containing BZCYYb by spin coating in such a way as to form a 3 µm-thick film of the BZCYYb-dispersed slurry, which is then baked at 1300° C. for 1 hours to obtain a proton conducting electrolyte of a double structure having a proton conducting electrolyte thin film formed on the pellet of NiO-containing BZCYYb, the proton conducting electrolyte thin film having less Ni content than the pellet.

NiO powder and BZCYYb powder are mixed together at a mass ratio of 6:4 to create mixed powder. Then, the mixed powder and a mixture of ethyl cellulose, plasticizer, dispersant, and α-trepineol are kneaded under room temperature by a kneading machine for 1 minute and 30 seconds to obtain slurry for the fuel electrode. The slurry for the fuel electrode is then applied to the surface of the pellet of NiO-containing BZCYYb of the proton conducting electrolyte having the double structure, by screen printing, in such a way as to form a 20 µm-thick film of the slurry for the fuel electrode, which is then baked at 1350° C. for 3 hour to obtain the fuel electrode. After the baking process, the fuel electrode shows a porosity of 23.3 volume %.

LSCF powder and BZCYYb powder are mixed together at a mass ratio of 7:3 to create mixed powder. Then, the mixed powder and a mixture of ethyl cellulose, plasticizer, dispersant, and α-trepineol are kneaded by a kneading machine under room temperature for 1 minute and 30 seconds to obtain slurry for the air electrode. The slurry for the air electrode is then applied to the proton conducting electrolyte thin film of the proton conducting electrolyte having the double structure, by screen printing, in such a way as to form a 20 µm-thick film of the slurry for the air electrode, which is then baked at 1050° C. for 1 hour to obtain the air electrode. Through the above processes, the solid oxide cell according to the fourth example has been manufactured.

First Comparative Example

As a comparative example (first comparative example) to be compared with the first example and the second example, a sample has been fabricated by the following procedure.

NiO and BZCYYb are mixed together at a mass ratio of 6:4 to create mixed powder, which is then subjected to uniaxial press molding under a pressure of 20 MPa per a circular area of 30 mm in diameter.

A compact resulting from the press molding is baked at 900° C. for 1 hour to obtain a calcinated form of a fuel electrode support of 1 mm in thickness.

Ethanol/toluene-mixed-solvent-based BZCYYb-dispersed slurry, whose viscosity is adjusted, is applied to the calcinated form of the fuel electrode support by spin coating in such a way as to form a 10 μm-thick film of the BZCYYb-dispersed slurry, which is then sintered together at 1350° C. for 3 hours to obtain a compact composed of a proton conducting electrolyte layer and the fuel electrode support. After the baking process, the fuel electrode support shows a porosity of 12.3 volume %.

LSCF powder and BZCYYb powder are mixed together at a mass ratio of 7:3 to create mixed powder. Then, the mixed powder and a mixture of ethyl cellulose, plasticizer, dispersant, and α-trepineol are kneaded by a kneading machine under room temperature for 1 minute and 30 seconds to obtain slurry for the air electrode. The slurry for the air electrode is then applied to a surface of proton conducting electrolyte layer that is different from a surface closer to the fuel electrode support, by screen printing, in such a way as to form a 20 μm-thick film of the slurry for the air electrode, which is then baked at 1050° C. for 1 hour to obtain the air electrode. Through the above processes, a solid oxide cell according to the first comparative example has been manufactured.

Second Comparative Example

As a comparative example (second comparative example) to be compared with the third example and the fourth example, a sample has been fabricated by the following procedure.

NiO and BZCYYb are mixed together such that BZCYYb contains Ni at a mass ratio of 2%. The resulting mixed powder is then subjected to uniaxial press molding under a pressure of 20 MPa per a circular area of 30 mm in diameter.

A compact resulting from the press molding is baked at 1350° C. for 3 hours to obtain a proton conducting electrolyte in the form of a compact pellet of NiO-containing BZCYYb of 1 mm in thickness.

NiO powder and BZCYYb powder are mixed together at a mass ratio of 6:4 to create mixed powder. Then, the mixed powder and a mixture of ethyl cellulose, plasticizer, dispersant, and α-trepineol are kneaded under room temperature by a kneading machine for 1 minute and 30 seconds to obtain slurry for the fuel electrode. The slurry for the fuel electrode is then applied to one surface of the proton conducting electrolyte by screen printing in such a way as to form a 20 μm-thick film of the slurry for the fuel electrode, which is then baked at 1350° C. for 3 hour to obtain the fuel electrode. After the baking process, the fuel electrode shows a porosity of 23.2 volume %.

LSCF powder and BZCYYb powder are mixed together at a mass ratio of 7:3 to create mixed powder. Then, the mixed powder and a mixture of ethyl cellulose, plasticizer, dispersant, and α-trepineol are kneaded by a kneading machine under room temperature for 1 minute and 30 seconds to obtain slurry for the air electrode. The slurry for the air electrode is then applied to the surface of proton conducting electrolyte that is opposite to the surface coated with the fuel electrode, by screen printing, in such a way as to form a 20 μm-thick film of the slurry for the air electrode, which is then baked at 1050° C. for 1 hour to obtain the air electrode. Through the above processes, a solid oxide cell according to the second comparative example has been manufactured.

Third Comparative Example

As a comparative example (third comparative example) to be compared with the third example and the fourth example, a sample has been fabricated by the following procedure.

NiO and BZCYYb are mixed together such that BZCYYb contains Ni at a mass ratio of 5%. The resulting mixed powder is then subjected to uniaxial press molding under a pressure of 20 MPa per a circular area of 30 mm in diameter.

A compact resulting from the press molding is baked at 1350° C. for 3 hours to obtain a proton conducting electrolyte in the form of a compact pellet of NiO-containing BZCYYb of 1 mm in thickness.

NiO powder and BZCYYb powder are mixed together at a mass ratio of 6:4 to create mixed powder. Then, the mixed powder and a mixture of ethyl cellulose, plasticizer, dispersant, and α-trepineol are kneaded under room temperature by a kneading machine for 1 minute and 30 seconds to obtain slurry for the fuel electrode. The slurry for the fuel electrode is then applied to one surface of the proton conducting electrolyte by screen printing in such a way as to form a 20 μm-thick film of the slurry for the fuel electrode, which is then baked at 1350° C. for 3 hour to obtain the fuel electrode. After the baking process, the fuel electrode shows a porosity of 22.5 volume %.

LSCF powder and BZCYYb powder are mixed together at a mass ratio of 7:3 to create mixed powder. Then, the mixed powder and a mixture of ethyl cellulose, plasticizer, dispersant, and α-trepineol are kneaded by a kneading machine under room temperature for 1 minute and 30 seconds to obtain slurry for the air electrode. The slurry for the air electrode is then applied to the surface of proton conducting electrolyte that is opposite to the surface coated with the fuel electrode, by screen printing, in such a way as to form a 20 μm-thick film of the slurry for the air electrode, which is then baked at 1050° C. for 1 hour to obtain the air electrode. Through the above processes, a solid oxide cell according to the third comparative example has been manufactured.

<Measuring Relative Density>

Sections of the solid oxide cells of the first, second, and third examples and the first and second comparative examples are observed with a scanning electron microscope (SEM) manufactured by JEOL Ltd. (JSM-5600), and images captured by the SEM are processed to analyze their contrasts and calculate the relative density of the proton conducting electrolyte in each example. For the samples of the first and second examples and the first comparative example, the relative density is calculated in an area ranging from the fuel electrode to a point 5 μm or less distant from the fuel electrode in the thickness direction. For the samples of the third and fourth examples and the second and third comparative examples, the relative density in the NiO-containing BZCYYb portion is calculated. Calculation results are shown in table 1.

TABLE 1

| | Relative density (volume %) |
|---|---|
| First example | 98.2 |
| Second example | 98.1 |
| Third example | 98.6 |

TABLE 1-continued

| | Relative density (volume %) |
|---|---|
| Fourth example | 98.5 |
| First comparative example | 98.1 |
| Second comparative example | 98.5 |
| Third comparative example | 99.2 |

It has been confirmed that in all the samples of the first, second, third, and fourth examples and the first, second, and third comparative examples, the relative density is equal to or higher than 98 volume %. A relative density as a criterion for gas cross-leak prevention is 96%. This leads to a conclusion that those samples are sufficiently capable of preventing gas cross-leak.

<Measuring Ni Distribution (First and Second Examples and First Comparative Example>

A section of the solid oxide cell of the first example has been analyzed with a field-emission electron probe microanalyzer (EPMA) manufactured by Shimazu Corporation (EPMA-8050G) to quantify an Ni content distribution in the film thickness direction. Analysis results are shown in FIG. 3.

Figure 3:
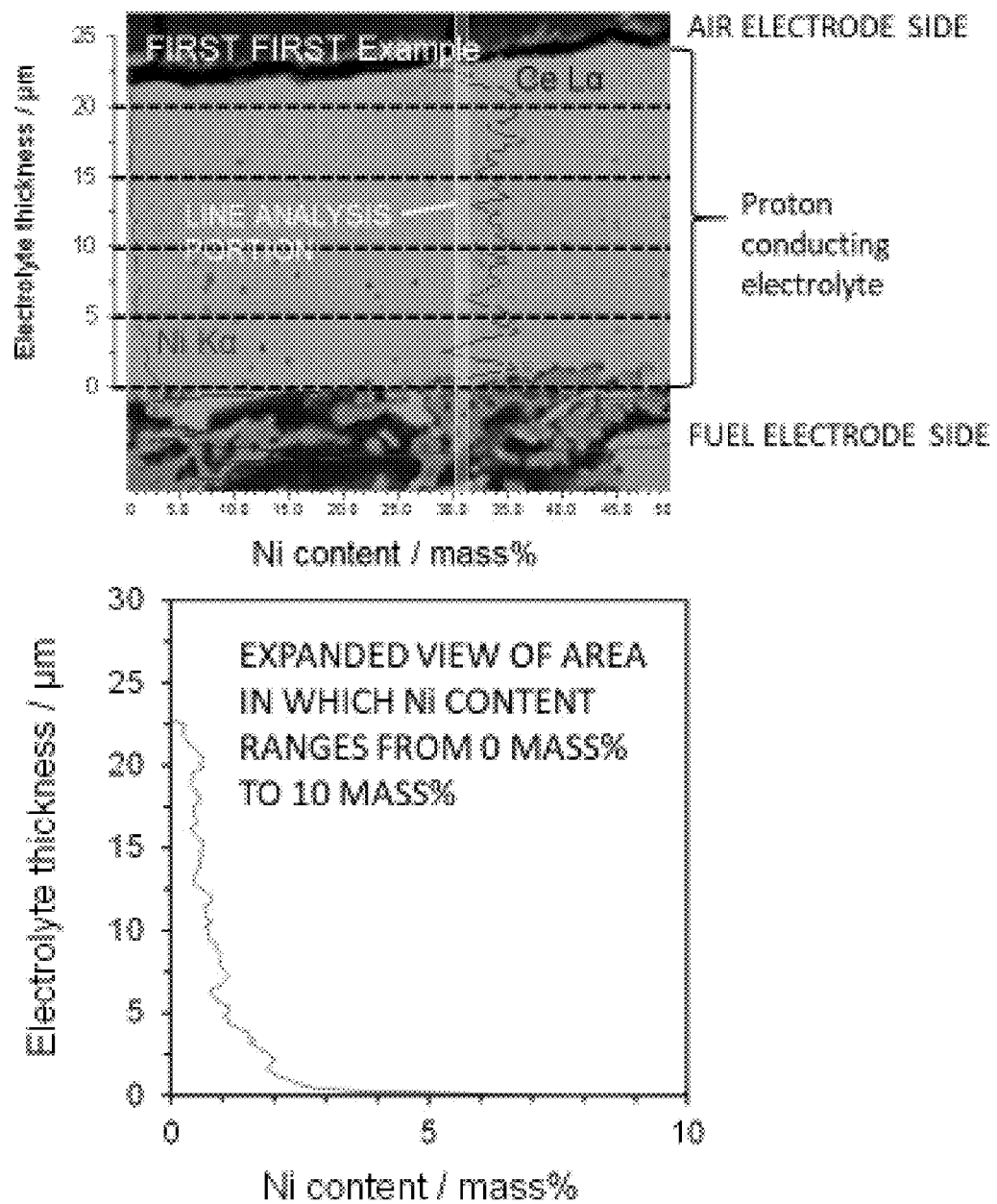
FIG. 3 depicts a result of an electron probe microanalysis (EPMA), showing a distribution of Ni content of the proton conducting electrolyte of a first example in its thickness direction.
Figure 4:
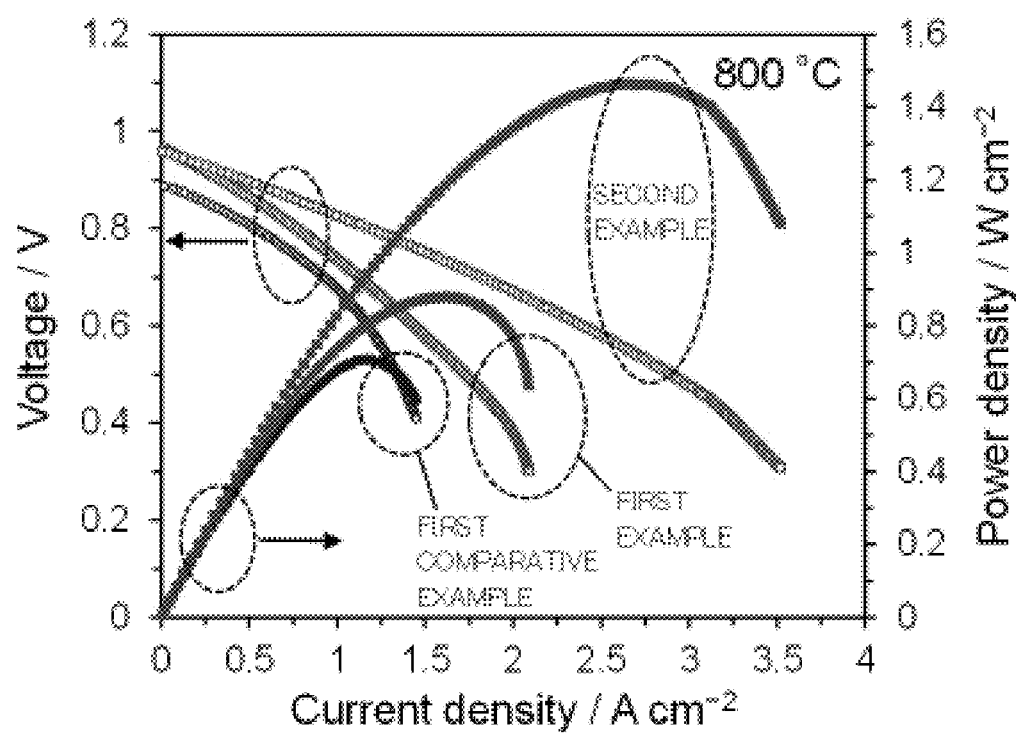
FIG. 4 depicts results of measurement of power generation characteristics in the first example, a second example, and a first comparative example.

As it is understood from a spectrum shown on an upper part of FIG. 3 and a spectrum shown on a lower part of the same, the lower part being an expansion of an area in which Ni content ranges from 0 mass % to 10 mass %, in the solid oxide cell of the first example, the Ni content of the proton conducting electrolyte changes gradually to show an Ni content gradation, which indicates that Ni content is larger on the fuel electrode side and is smaller on the air electrode side. In an area extending from the fuel electrode to a point about 2.0 μm distant from the fuel electrode side in the film thickness direction (first portion), Ni content is 2 mass % or more. In an area extending from the air electrode to a point about 10 μm distant from the air electrode side in the film thickness direction (second portion), on the other hand, Ni content is 1 mass % or less. It has thus been confirmed that the proton conducting electrolyte has been obtained as a proton conducting electrolyte in which the fuel electrode side having larger Ni content functions as a gas cross-leak preventing portion while the air electrode side having smaller Ni contents functions as an electron leak preventing portion.

In the same manner as in the first example, a section of the solid oxide cell of the second example has been analyzed with the EPMA. The analysis has found that, in the proton conducting electrolyte first layer (first portion), which is the proton conducting electrolyte formed on the fuel electrode side, Ni content is 2 mass % or more in the entire points in the film thickness direction. In the proton conducting electrolyte second layer (second portion), which is formed on the proton conducting electrolyte first layer, on the other hand, Ni content is 1 mass % or less in the entire points in the film thickness direction. It has thus been confirmed from this result that the proton conducting electrolyte has been obtained as a proton conducting electrolyte in which the proton conducting electrolyte first layer functions as the gas cross-leak preventing portion while the proton conducting electrolyte second layer functions as the electron leak preventing portion.

In the same manner as in the first and second examples, a section of the solid oxide cell of the first comparative example has been analyzed with the EPMA. The analysis has found that, in the proton conducting electrolyte layer, Ni content is 2 mass % or more in the entire points in the film thickness direction.

<Measuring Electromotive Force>

In the solid oxide cells of the first, second, third, and fourth examples and the first, second, and third comparative examples, hydrogen humidified under room temperature and air humidified under room temperature have been supplied to the fuel electrode and the air electrode, respectively, and the electromotive force of the solid oxide cells have been measured under temperatures ranging from 500° C. to 800° C. Measurement results are shown in table 2.

TABLE 2

| | Electromotive force (V) | | | |
|---|---|---|---|---|
| | 800° C. | 700° C. | 600° C. | 500° C. |
| First example | 0.971 | 1.018 | 1.050 | 1.077 |
| Second example | 0.965 | 1.033 | 1.070 | 1.090 |
| Third example | 1.007 | 1.040 | 1.065 | 1.082 |
| Fourth example | 0.955 | 1.006 | 1.043 | 1.073 |
| First comparative example | 0.887 | 0.958 | 0.983 | 0.998 |
| Second comparative example | 0.787 | 0.912 | 0.950 | 0.980 |
| Third comparative example | 0.772 | 0.900 | 0.941 | 0.972 |

The samples of the first, second, third, and fourth examples have shown electromotive forces higher than those generated by the samples of the first, second, and third comparative examples. The result of relative density measurement indicates that none of the samples of the first, second, third, and fourth examples and the first, second, and third comparative examples causes a gas cross-leak. Checking an exhaust gas flow rate on the fuel electrode side and on the air electrode side, using a gas flow meter manufactured by GL Sciences Inc. (GF1010), has led to a finding that an exhaust gas flow rate matches a supply gas flow rate on both fuel electrode side and air electrode side. This indicates that no gas cross-leak occurs in a measurement system, either. It is thus concluded that the above difference in electromotive force has been caused by an electron leak.

From the above results, it has been confirmed that, in the solid oxide cell of the first example, the portion (first portion) having larger NiO content on the fuel electrode side in the proton conducting electrolyte layer functions as the gas cross-leak preventing portion, while the portion (second portion) having smaller NiO content on the air electrode side functions as the electron leak preventing portion.

It has been confirmed also that, in the solid oxide cell of the second example, the proton conducting electrolyte is provided as the proton conducting electrolyte in which the proton conducting electrolyte first layer (first portion), which has larger NiO content, functions as the gas cross-leak preventing portion while the proton conducting electrolyte second layer (second portion), which has smaller NiO content, functions as the electron leak preventing portion.

It has been confirmed also that, in the solid oxide cells of the third and fourth examples, the pellet of NiO-containing BZCYYb pellet (first portion) functions as the gas cross-leak preventing layer while the BCZYYb layer (second portion) functions as the electron leak preventing layer. In the third and fourth examples, the pellet of NiO-containing BZCYYb is 1 mm in thickness. Having sufficient relative density, however, the pellet of NiO-containing BZCYYb offers the same gas cross-leak preventing effect even if it is reduced in thickness to be scores μm to several μm in thickness.

<Power Generation Characteristics>

In the solid oxide cells of the first and second examples and first comparative example, hydrogen humidified under room temperature and air humidified under room temperature have been supplied to the fuel electrode and the air electrode, respectively, and the power generation characteristics (current-voltage characteristics and current-power output characteristics) of the solid oxide cells have been measured at 800° C. Measurement results are shown in table 4.

Compared to the solid oxide cell of the first comparative example, the solid oxide cells of the first and second examples show higher power output density. The solid oxide cells of the first and second examples show electromotive forces higher than an electromotive force generated by the solid oxide cell of the first comparative example. This superiority in electromotive force is reflected in higher power output density. In the second example, in particular, the proton conducting electrolyte suppresses electron leak despite the fact it is a thin layer of 13 µm in thickness. The proton conducting electrolyte thus shows higher power output density.

INDUSTRIAL APPLICABILITY

The present invention provides a thin-film-shaped proton conducting electrolyte capable of suppressing both gas cross-leak and electron leak. This allows a solid oxide cell using the proton conducting electrolyte to achieve power generation efficiency and hydrogen separation performance higher than those achieved by the conventional techniques. Such a solid oxide cell is thus useful as an electrochemical device for use in future applications.

The invention claimed is:
1. A proton conducting electrolyte using an oxide material having proton conductivity, the proton conducting electrolyte comprising:
    a first portion containing Me, wherein Me is at least one selected from the group consisting of Ti, Mn, Fe, Co and Ni; and
    a second portion different in Me content from the first portion,
    wherein the proton conducting electrolyte is of a thin-film shape, and the Me content gradually decreases from one surface to another surface,
    wherein the Me content is 2 mass % or more and 20 mass % or less in a portion ranging from the one surface to a point 0.5 µm or less distant from the one surface in a thickness direction while the Me content is 0 mass % or more and less than 2 mass % in a portion ranging from the other surface to a point 0.5 µm or less distant from the other surface in the thickness direction,
    wherein the oxide material is an oxide expressed as $A_XB_YO_{3+Z}$,
    wherein A is at least one selected from the group consisting of Sr, Ba, and La,
    wherein B contains Yb, and
    wherein $0.8 \leq X \leq 1.2$, $0.8 \leq Y \leq 1.2$, and $-1 \leq Z \leq 1$.
2. A proton conducting electrolyte using an oxide material having proton conductivity, the proton conducting electrolyte comprising:
    a first portion containing Me, wherein Me is at least one selected from the group consisting of Ti, Mn, Fe, Co and Ni; and
    a second portion different in Me content from the first portion,
    comprising a plurality of layers including: a layer containing the first portion and the oxide material; and a layer containing the second portion and the oxide material,
    a first layer having the Me of 2 mass % or more and 20 mass % or less; and a second layer having the Me of 0 mass % or more and less than 2 mass %, the second layer being laminated on the first layer,
    wherein the oxide material is an oxide expressed as $A_XB_YO_{3+Z}$,
    wherein A is at least one selected from the group consisting of Sr, Ba, and La,
    wherein B contains Yb, and
    wherein $0.8 \leq X \leq 1.2$, $0.8 \leq Y \leq 1.2$, and $-1 \leq Z \leq 1$.
3. The proton conducting electrolyte according to claim 1, wherein the B of oxide material $A_XB_YO_{3+z}$ comprise at least any one of Zr, Ce, Sc, Y, and In.
4. The proton conducting electrolyte according to claim 1, wherein the proton conducting electrolyte is 1.5 µm to 30 µm in thickness.
5. A laminated structure comprising: the proton conducting electrolyte according to claim 1; and an electrode formed on one surface of the proton conducting electrolyte.
6. A solid oxide cell comprising another electrode formed on the other surface of the laminated structure according to claim 5.
7. The proton conducting electrolyte according to claim 2, wherein the B of oxide material $A_XB_YO_{3+z}$ comprise at least any one of Zr, Ce, Sc, Y, and In.
8. The proton conducting electrolyte according to claim 2, wherein the proton conducting electrolyte is 1.5 µm to 30 µm in thickness.
9. A laminated structure comprising: the proton conducting electrolyte according to claim 2; and an electrode formed on one surface of the proton conducting electrolyte.
10. A solid oxide cell comprising another electrode formed on the other surface of the laminated structure according to claim 9.

* * * * *